United States Patent
Lin

(10) Patent No.: US 10,130,042 B2
(45) Date of Patent: Nov. 20, 2018

(54) CONTROL DEVICE OF CUTTING TOOL

(71) Applicant: BOR SHENG INDUSTRIAL CO., LTD., Taichung (TW)

(72) Inventor: Shih-Chang Lin, Taichung (TW)

(73) Assignee: BOR SHENG INDUSTRIAL CO., LTD., Taichung (TW)

(*) Notice: Subject to any disclaimer, the term of this patent is extended or adjusted under 35 U.S.C. 154(b) by 159 days.

(21) Appl. No.: 15/009,840

(22) Filed: Jan. 29, 2016

(65) Prior Publication Data
US 2017/0215346 A1   Aug. 3, 2017

(51) Int. Cl.
*A01G 3/02* (2006.01)
*B26B 13/16* (2006.01)
*B26B 13/26* (2006.01)

(52) U.S. Cl.
CPC .............. *A01G 3/021* (2013.01); *B26B 13/16* (2013.01); *B26B 13/26* (2013.01)

(58) Field of Classification Search
CPC ......... B26B 13/16; B26B 13/26; B26B 13/28; A01G 3/02; A01G 3/021
USPC .......................................................... 30/262
See application file for complete search history.

(56) References Cited

U.S. PATENT DOCUMENTS

| | | | | |
|---|---|---|---|---|
| 309,889 A | * | 12/1884 | Shepard | B26B 13/16 30/262 |
| 2,189,211 A | * | 2/1940 | Lind | A01G 3/02 30/262 |
| 4,258,472 A | * | 3/1981 | Wallace | B26B 13/00 30/262 |
| 5,774,991 A | * | 7/1998 | Shi | B26B 13/16 30/254 |
| 5,987,755 A | * | 11/1999 | Shih | A01G 3/02 30/254 |
| D434,285 S | * | 11/2000 | Podlesny | D8/5 |
| 6,772,520 B1 | * | 8/2004 | Shih | A01G 3/02 30/190 |
| D607,702 S | * | 1/2010 | Wu | D8/5 |
| 7,895,757 B1 | * | 3/2011 | Huang | A01G 3/02 30/192 |
| D638,673 S | * | 5/2011 | Huang | D8/5 |
| 8,832,945 B2 | * | 9/2014 | Yang | B23D 29/00 30/254 |
| D775,504 S | * | 1/2017 | Dechant | D8/52 |
| 2002/0000044 A1 | * | 1/2002 | Huang | A01G 3/02 30/250 |

(Continued)

FOREIGN PATENT DOCUMENTS

| DE | 202009001893 U1 | * | 4/2009 | .......... A01G 3/0251 |
|---|---|---|---|---|
| DE | 20201008950 U1 | * | 2/2011 | |

(Continued)

*Primary Examiner* — Laura M Lee
(74) *Attorney, Agent, or Firm* — Raymond Y. Chan; David and Raymond Patent Firm

(57) ABSTRACT

A control device of a cutting tool formed by a first component and a second component pivotally connected to each other is pivotally connected to the second component. The control device can be pushed to act on the second component. The cutting tool performs multi-stage or one-time cutting according to the control device being pushed to the required position. Moreover, the first component and the second component are close to or away from each other under control of the control device.

8 Claims, 10 Drawing Sheets

(56) References Cited

U.S. PATENT DOCUMENTS

| | | | | |
|---|---|---|---|---|
| 2008/0184567 A1* | 8/2008 | Jou | ................. | A01G 3/02 30/262 |
| 2008/0295341 A1* | 12/2008 | Lipscomb | ................. | A01G 3/02 30/251 |
| 2009/0223059 A1* | 9/2009 | Yu Chen | ................. | B26B 13/26 30/92 |
| 2011/0154669 A1* | 6/2011 | Liu | ................. | A01G 3/02 30/260 |
| 2012/0023756 A1* | 2/2012 | Schneider | ................. | B26B 13/16 30/254 |
| 2013/0008563 A1* | 1/2013 | Reh | ................. | A01G 3/0251 144/24.13 |
| 2013/0031786 A1* | 2/2013 | Wang | ................. | A01G 3/021 30/251 |
| 2014/0290067 A1* | 10/2014 | Ronan | ................. | B23D 21/10 30/92 |
| 2015/0040407 A1* | 2/2015 | Lin | ................. | A01G 3/02 30/312 |
| 2015/0208589 A1* | 7/2015 | Chou | ................. | A01G 3/021 30/251 |
| 2017/0215346 A1* | 8/2017 | Lin | ................. | A01G 3/021 |

FOREIGN PATENT DOCUMENTS

| | | | | |
|---|---|---|---|---|
| DE | 202011051328 U1 | * | 11/2011 | ............... A01G 3/02 |
| DE | 202012103375 U1 | * | 9/2012 | ............... A01G 3/02 |
| EP | 3199308 A1 | * | 8/2017 | |
| TW | 272373 U | * | 8/2005 | |
| TW | 312405 U | * | 11/2006 | |

\* cited by examiner

CONTROL DEVICE OF CUTTING TOOL

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a control device of a cutting tool, especially to a control device of a cutting tool that controls the cutting tool to perform multi-stage cutting and locks a blade of the cutting tool at a closed position while the cutting tool is not in use.

Description of Related Arts

Generally, the stem of plants is hard and thick so that the stem requires training. The cutting tool/gardening shears for training should have sharp blades. For labor saving during operation of the cutting tool, a multi-stage cutting tool is available. Moreover, a cutting tool able to control cutting modes such as the one revealed in Taiwanese Patent No. M420981 is also available. Pruning shears revealed can be switched to a cutting mode focused on training of branches. The pruning shears includes a first handle and a second handle pivotally connected which users can hold and apply their forces to. A blade unit is pivotally connected to a front end of the first handle and is corresponding to a blunt part on arranged at the front end of the first handle. A drive rod is pivotally connected to the second handle. One end of the drive rod is movably connected to a rear end of the blade unit for pushing the blade to perform cutting. A switch element with a movable and linear structure is set on the second handle. The switch element is able to move linearly to become leaning against the blade unit or move in the opposite direction to get away from the blade unit. A safety fastener is disposed on the second handle for locking an operating piece of the blade unit when the pruning shears is in a closed position.

The switch element is used to control the cutting mode while the safety fastener is used to lock the operating piece of the blade unit. They are arranged at the second handle and separated from each other. The switch element is moved horizontally for pushing the blade unit while the safety fastener is worked in a pendulum manner.

Thus users need to operate two parts at the same time for controlling the cutting mode or changing the pruning shears to the closed position. The design causes inconvenience to users. Moreover, both assembly cost and component cost are increased.

SUMMARY OF THE PRESENT INVENTION

Therefore it is a primary object of the present invention to provide a control device of a cutting tool that switches the cutting tool to different cutting mode with lower cost. Moreover, the control device also provides a locking function.

In order to achieve the above objects, a control device of a cutting tool according to the present invention includes a first component and a second component. One end of the first component is extended to form an anvil part. One end of the first component is pivotally connected to a blade. One end of the blade is extended to form a blade handle. The blade handle includes a hollowed-out window and one end thereof is extended to form a pin. The blade and the anvil part are moved for cutting through the first component and the second component due to the pivotally connected first and second components and second components and other overlapped related parts.

The second component includes a first assembly part and a receiving space. The receiving space is formed by a first wall and a second wall, each of which is disposed with a first bulge and a second bulge used for positioning. The present invention features on that the receiving space is mounted with a control device and the control device is pivotally connected to the first wall and the second wall. The control device consists of a pivot part, a first holding part and a second holding part formed by extension of the pivot part, a platform part arranged between the first holding part and the second holding part, and a groove set on the platform part.

A support body is made from metal and having a connection part, a back part formed by extension of the connection part and a hook part formed by extension of one end of the back part. The shape of the connection part is matched with the shape of the groove for being mounted in the groove. The horizontal surface of the back part and the horizontal surface of the platform part are on the same plane while the hook part is projecting from the platform part. The pivot part is mounted into the receiving space. A pivot hole of the pivot part is aligned with pivot holes of the first and the second walls. Thereby the control device is pivotally connected to the second component. The first holding part and the second holding part are pushed and operated on the first wall and the second wall like a pendulum.

The pin of the blade is leaning against the back part of the support body while the first holding part and the second holding part being pushed to the first bulge. Thus the cutting tool is in a one-time cutting mode. When the first holding part and the second holding part is pushed to the second bulge, the pin of the blade is not leaning against the back part of the support body, so the cutting tool is in a multi-stage cutting mode.

Next, the first component and the second component are moved toward each other to make the blade and the anvil part become closed. Then the first holding part/the second holding part is pushed and moved to the position between the first bulge and the second bulge. Then the hook part is locked with the pin of the blade and the control device is used to lock the blade and the anvil part at the closed position.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn functions and features of the present invention, please refer to the following embodiments with detailed description and the figures.

Figure 1:
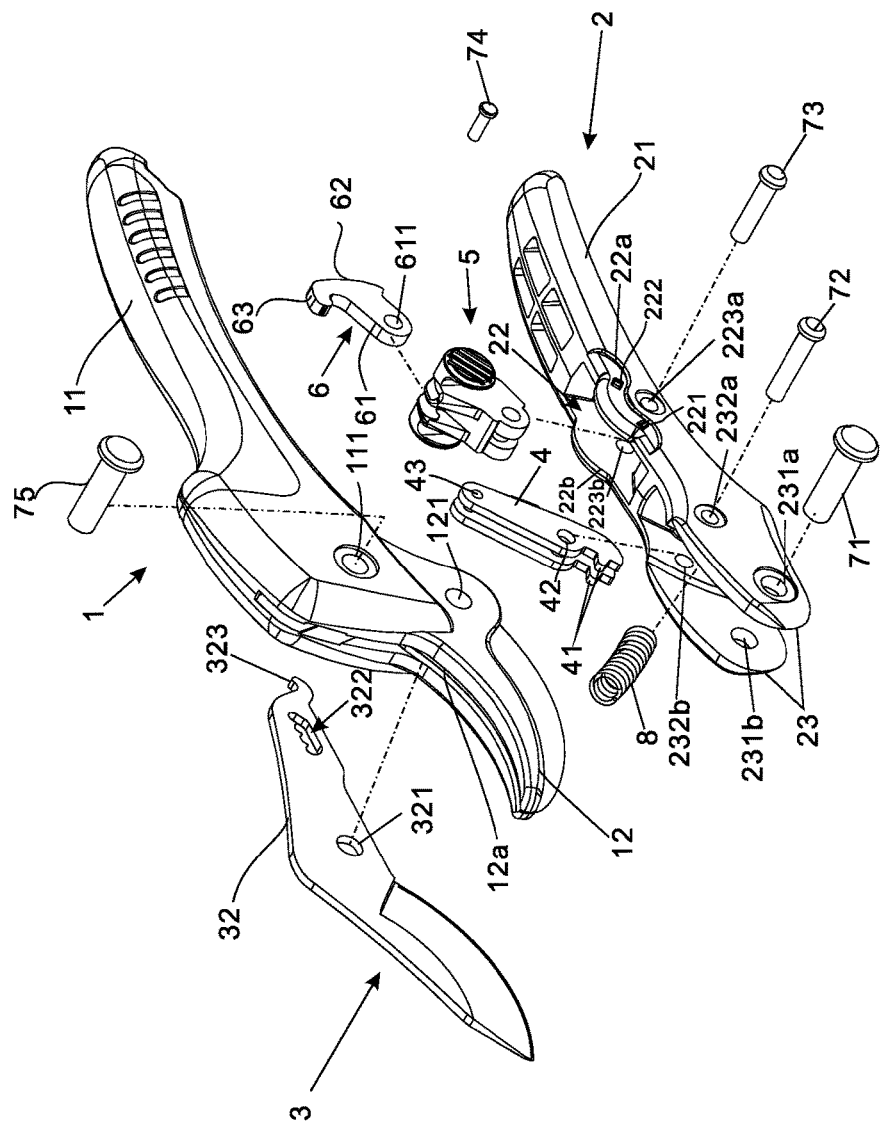
FIG. 1 is an explosive view of an embodiment according to the present invention.
Figure 2:
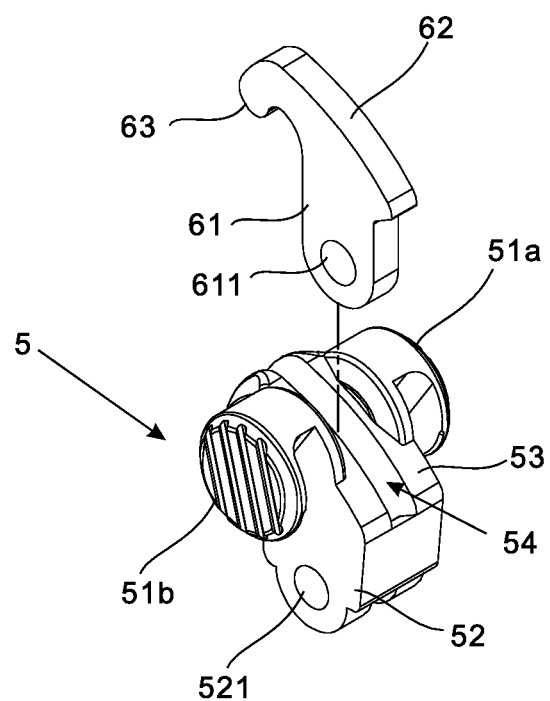
FIG. 2 is an explosive view of a control device of an embodiment according to the present invention.
Figure 3:
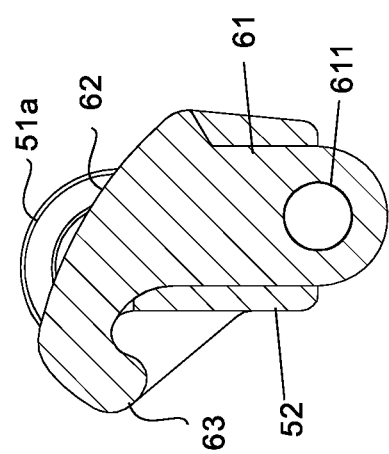
FIG. 3 is a longitudinal cross sectional view of a control device of an embodiment according to the present invention.

Refer to FIG. 1, FIG. 2 and FIG. 3, a control device of a cutting device includes a first component 1 and a second component 2. The first component 1 consists of a handle 11, an anvil part 12 formed by extension of one end of the handle 11. A slot 12a is longitudinally formed on the anvil part 12 while a first pivot hole 121 is disposed between the handle 11 and the anvil part 12. A second pivot hole 111 is mounted on the handle 11. The second component 2 is composed of a handle part 21, a receiving space 22 and a first assembly part 23. The first assembly part 23 formed by a pair of plates extended from one end of the handle part 21 is arranged with third pivot holes 231a, 231b and fourth pivot holes 232a, 232b. The second pivot hole 111 is used for pivotal connection to a blade 3 and a blade handle 32 formed by extension of one end of the blade 3. An insertion hole 321 and a hollowed-out window 322 are mounted on the blade handle 32 while one end of the blade handle 32 is extended to form a pin 323. The blade handle 32 is passed through the slot 12a of the anvil part 12 and the insertion hole 321 thereof is aligned with and pivotally connected to the second pivot hole 111 by a shaft 75. The first pivot hole 121 is aligned with and pivotally connected to the third pivot holes 231a, 231b by a shaft 71.

Refer to FIG. 2, one end of the handle 21 of the second component 2 is the receiving space 22 formed by a first wall 22a and a second wall 22b. The first wall 22a and the second wall 22b are disposed with a pivot hole 223a, 223b respectively. Both the first wall 22a and the second wall 22b are arranged with a first bulge 221 and a second bulge 222. The receiving space 22 is for mounting a control device 5. The control device 5 includes a pivot part 52 with a pivot hole 521, a first holding part 51a and a second holding part 51b formed by extension of the pivot part 52, a platform part 53 between the first holding part 51a and the second holding part 51b, and a groove 54 set on the platform part 53.

Refer to FIG. 2, a support body 6 made from metal includes a connection part 61 with a pivot hole 611, a back part 62 formed by extension of the connection part 61 and a hook part 63 formed by extension of one end of the back part 62. The pivot hole 611 of the support body 6 is aligned with and assembled with the pivot hole 521 of the pivot part 52. The shape of the connection part 61 is matched with the shape of the groove 54. The horizontal surface of the back part 62 and the horizontal surface of the platform part 53 are on the same plane while the hook part 63 is projecting from the platform part 53 after the support body 6 being mounted into the groove 54, as shown in FIG. 3.

Figure 4:
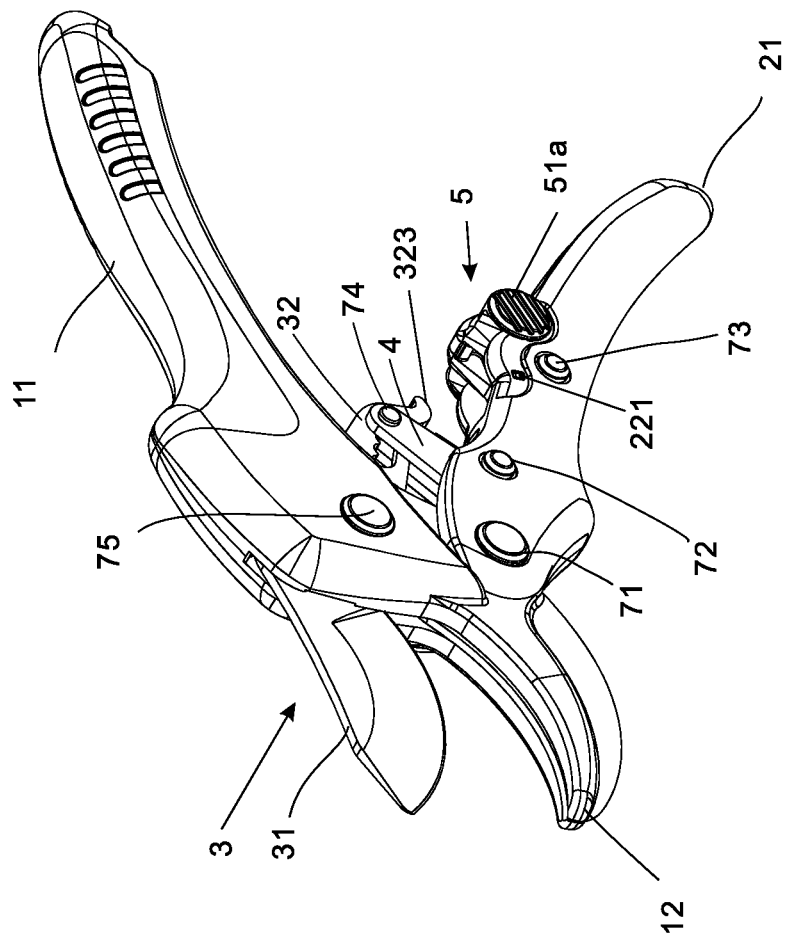
FIG. 4 is a perspective view of an embodiment according to the present invention.
Figure 5:
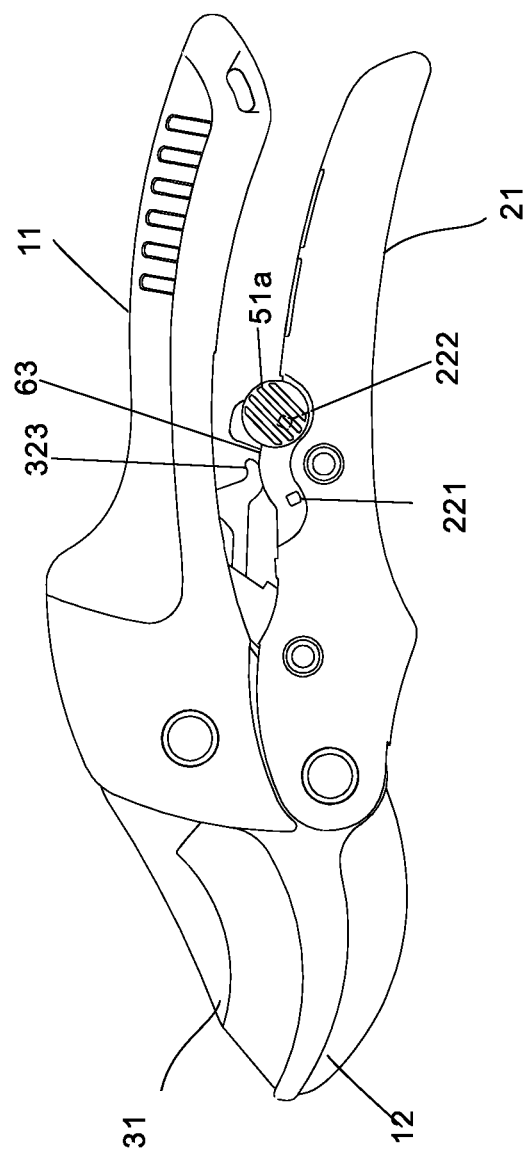
FIG. 5 is a schematic drawing showing an embodiment in use according to the present invention.

Refer to FIG. 1 and FIG. 4, the pivot part 52 is mounted into the receiving space 22. The pivot hole 521 is aligned with the pivot holes 223a, 223b of the first and the second walls 22a, 22b and then pivotally connected to the second component 2 by a shaft 73. Thus the control device 5 is rotatable and stopped within the receiving space 22. The first holding part 51a and the second holding part 51b are respectively leaning against the first wall 22a and the second wall 22b. Thus the control device 5 can be operated like a pendulum.

A connection rod 4 consists of a protruding part 41, a first hole 42 at one end, and a second hole 43 at the other end 43. A spring 8 is fitted on the protruding part 41. The first hole 42 is aligned with the fourth pivot holes 232a, 232b and pivotally connected to the second component 2 by a shaft 72. The second hole 43 is aligned with and pivotally connected to the window 322 of the blade 3 by the shaft 73. Thereby the end part of the connection rod 4 with the second hole 43 can be moved a certain distance within the window 322.

Figure 6:
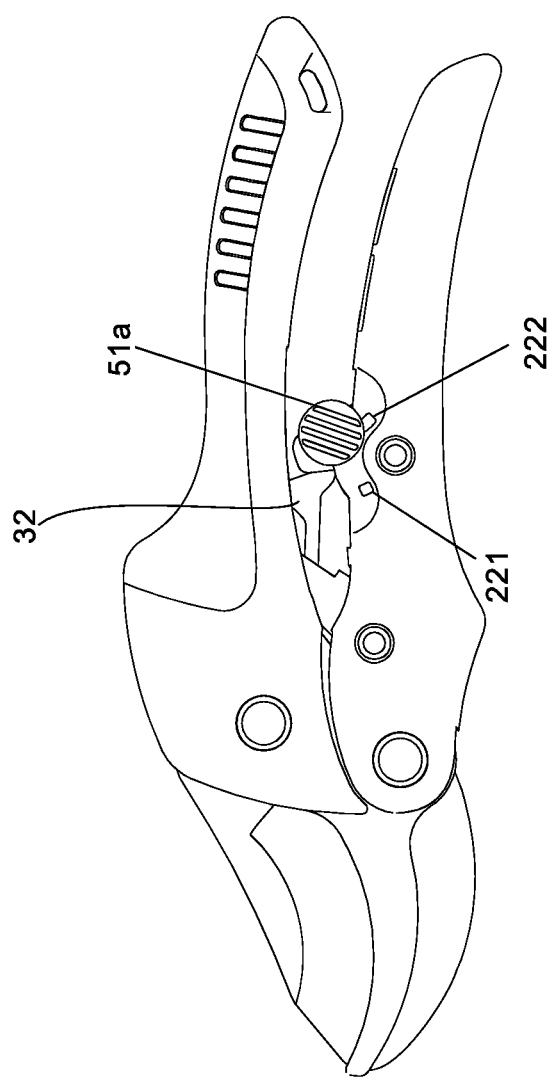
FIG. 6 is another schematic drawing showing the embodiment of FIG. 5 in use according to the present invention.
Figure 8:
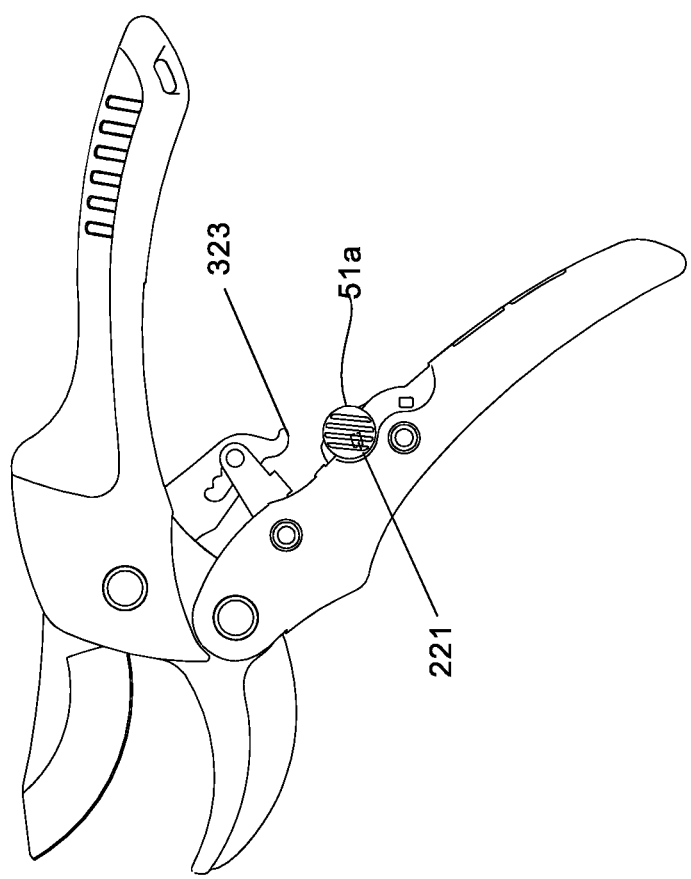
FIG. 8 is a further schematic drawing showing an embodiment in use according to the present invention.
Figure 9:
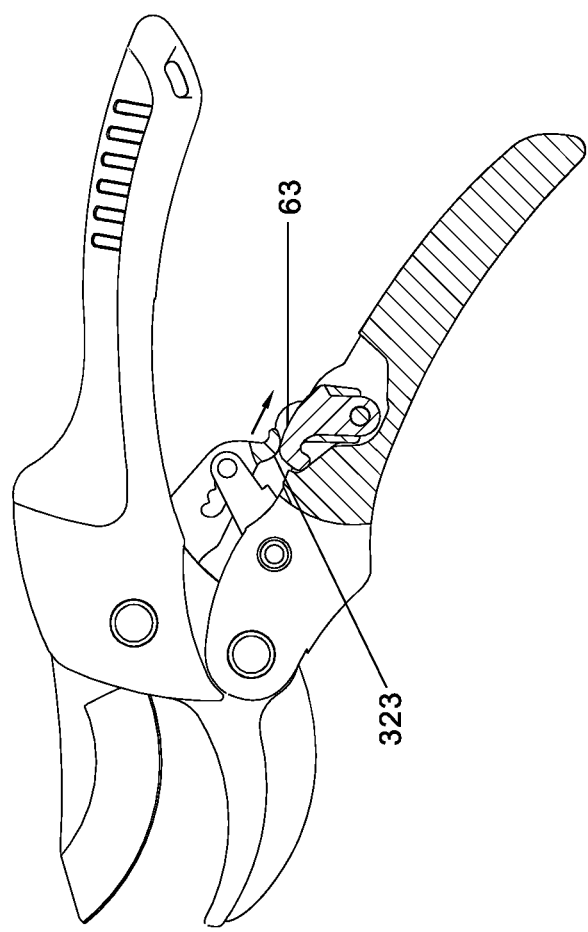
FIG. 9 is a further schematic drawing showing an embodiment in use according to the present invention.
Figure 10:
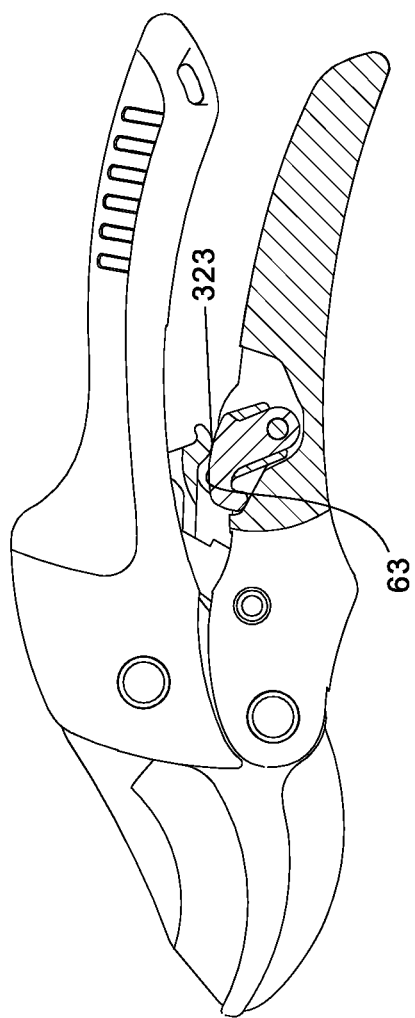
FIG. 10 is a further schematic drawing showing an embodiment in use according to the present invention.

Refer to FIG. 1 and FIG. 4, a part of the anvil part 12 of the first component 1 with the first pivot hole 121 is set into the first assembly part 23 and the first pivot hole 121 is aligned with the third pivot holes 231a, 231b of the second component 2. The shaft 71 is passed through and pivotally connected the third pivot hole 231a, the first pivot hole 121, the insertion hole 321 and the third pivot hole 231b. By the above pivotally connected first and second components and other overlapped related parts, the blade 3 and the anvil part 12 are moved for cutting through the first component 1 and the second component 2. Refer to FIG. 8, the blade 3 and the anvil part 12 are in an open position and ready for cutting. As shown in FIG. 6, the blade 3 and the anvil part 12 are in a closed position. The first component 1 and the second component 2 are limited and unable to be operated for cutting.

Figure 7:
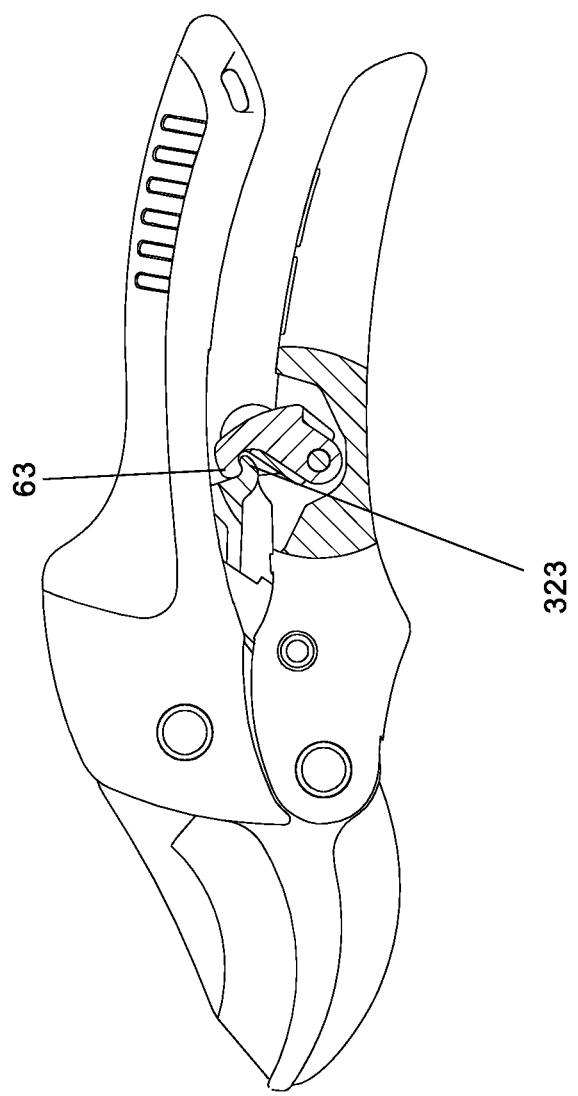
FIG. 7 is a longitudinal cross sectional view of the embodiment of FIG. 6 according to the present invention.

Refer to FIG. 5, FIG. 8, FIG. 9 and FIG. 10, the pin 323 of the blade 3 is leaning against the back part 62 of the support body 6 while the first holding part 51a/the second holding part 51b being pushed to the first bulge 221. Thus the cutting tool is in a cutting mode of one-time cutting. When the first holding part 51a/the second holding part 51b is pushed to the second bulge 222, the pin 323 of the blade 3 is not leaning against the back part 62 of the support body 6 and the cutting tool in a multi-stage cutting mode can perform multi-stage cutting. Refer to FIG. 7, the blade 3 and the anvil part 12 are getting closer to each other and then becoming closed when the first component 1 and the second component 2 are moved toward each other. Then the first holding part 51a/the second holding part 51b is pushed to move from the second bulge 222 to the position between the first bulge 221 and the second bulge 222. Then the hook part 63 is locked with the pin 323 of the blade 3 and the control device 5 is used to lock the blade 3 and the anvil part 12 at the closed position.

In summary, the present invention has the following advantages.

1. The support body 6 for the control device 5 is made from metal that is hard and wear resistant. Thus the support body 6 will not be worn out when the pin 323 of the blade 3 is leaning against the back part 62 of the support body 6 and still worked normally even after being operated multiple times.

2. The support body 6 for the control device 5 includes the hook part 63 so that the control device 5 can provide a locking function.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A cutting tool, comprising:
   a blade;
   a control device;
   a pivot part with a pivot hole, two holding parts formed by and extension of said pivot part, a platform part located between said holding parts and a groove formed on said platform part; and
   a support body having a connection part, a back part formed by an extension of said connection part and a hook part formed by an extension of one end of said back part;
   wherein said cutting tool further includes a first component, a second component and a connection rod; said first component includes an anvil part; said first component is pivotally connected to said blade and one end of said blade is extended to form a blade handle while said blade handle includes an insertion hole, a hollowed-out window and a pin formed by an extension of one end thereof; said blade handle passes through said anvil part and is pivotally connected to one end of said first component; said second component includes a first assembly part and a receiving space formed by a first wall and a second wall; both said first wall and said second wall are disposed with a pivot hole; said first wall and said second wall are arranged with a first bulge and a second bulge respectively; said receiving space is used for mounting said control device and said control device is pivotally connected to said second component;
   wherein one end of said connection rod is pivotally connected to said second component while the other end thereof is pivotally connected to said window of said blade by a shaft so that the other end of said connection rod pivotally connected by said shaft moves a distance within said window;
   wherein said blade and said anvil part are switched between an open position and a close position by the pivotal connection of said first component and said second component;
   wherein said support body is made from metal; a shape of the connection part is matched with a shape of said groove for being mounted in said groove; a horizontal surface of said back part and a horizontal surface of said platform part are on the same plane and said hook part projects from said platform part when said connection part is mounted in said groove, aligned with pivot hole of said pivot part, and pivotally connected to said second component; wherein said pivot part is mounted in said receiving space, aligned with said pivot holes of said first wall and said second wall, and pivotally connected to said second component by a shaft so that said control device is rotatable within said receiving space; said control device operates like a pendulum by pushing said holding parts;
   wherein when said holding parts are pushed towards said first bulge, said cutting tool is in a one-time cutting mode in which said pin of said blade leans against said back part of said support body; wherein when said holding parts are pushed towards said second bulge, said cutting tool is in a multi-state cutting mode in which said pin of said blade does not lean against said back part of said support body; wherein when said hook part is locked within said pin of said blade, said control device is used to lock said blade and said anvil part at said closed position.

2. A cutting tool comprising:
   a blade;
   a pin formed at one end of said blade;
   a control device;
   a pivot part with a pivot hole, two holding parts formed by an extension of said pivot part, a platform part located between said holding parts and a groove formed on said platform part; and
   a support body having a connection part, a back part formed by an extension of said connection part and a hook part formed by an extension of one end of said back part;
   wherein said cutting tool further includes a first component and a second component pivotally connected to each other and operated for performing cutting; wherein said second component includes a receiving space for mounting said control device, and a first bulge and a second bulge;
   wherein said support body is made from metal; a shape of said connection part is matched with a shape of said groove for being mounted in said groove; a horizontal surface of said back part and a horizontal surface of said platform part are on the same plane and said hook part projects from said platform part when said connection part is mounted in and pivotally connected to said groove; wherein said pivot part is mounted in said receiving space and pivotally connected to said second component by a shaft extending through the pivot hole of said pivot part and said receiving space so that said control device operates like a pendulum by pushing said holding parts;
   wherein when said holding parts are pushed towards said first bulge, said cutting tool is in a one-time cutting mode in which said pin of said blade leans against said back part of said support body; wherein when said holding parts are pushed towards said second bulge, said cutting tool is in a multi-state cutting mode in which said pin of said blade does not lean against said back part of said support body;
   wherein when said hook part is locked within said pin of said blade, said control device is used to lock said blade and said anvil part at said closed position.

3. The cutting tool as claimed in claim 2, wherein the holding parts include a first holding part and a second holding part corresponding to each other.

4. A cutting tool, comprising:
   a blade;
   a control device;
   a pivot part with a pivot hole, a first holding part and a second holding part formed by an extension of said pivot part, a platform part located between said first holding part and said second holding part, and a groove formed on said platform part; and
   a support body having a connection part, a back part formed by an extension of said connection part and a hook part formed by an extension of one end of said back part;
   wherein said cutting tool further includes a first component, a second component and a connection rod; said first component and said second component are pivotally connected to each other and operated for performing cutting; wherein said first component includes an anvil part; said first component is pivotally connected to said blade and one end of said blade is extended to form a blade handle while said blade handle includes an insertion hole, a hollowed-out window and a pin formed by extension of one end thereof; said blade handle passes through said anvil part and is pivotally connected to one end of said first component; said second component includes a first assembly part and a receiving space for mounting said control device; said first assembly part is disposed with a pivot hole and arranged with a first bulge and a second bugle;

wherein one end of said connection rod is pivotally connected to said second component and the other end thereof is pivotally connected to said window of said blade by a shaft so that the other end of said connection rod pivotally connected by said shaft moves a distance within said window;

wherein said support body is made from metal; a shape of said connection part is matched with a shape of said groove and mounted in said groove; a horizontal surface of said back part and a horizontal surface of said platform part are on the same plane and said hook part projects from said platform part when said connection part is mounted in said groove, aligned with pivot hole of said pivot part and pivotally connected to said second component;

wherein said pivot part is mounted in said receiving space, and pivotally connected to said second component by a shaft so that said control device operates like a pendulum by pushing said first holding part and said second holding part;

wherein when said holding parts are pushed towards said first bulge, said cutting tool is in a one-time cutting mode in which said pin of said blade leans against said back part of said support body; wherein when said holding parts are pushed towards said second bulge, said cutting tool is in a multi-state cutting mode in which said pin of said blade does not lean against said back part of said support body;

wherein when said hook part is locked within said pin of said blade, said control device is used to lock said blade and said anvil part at said closed position.

5. The cutting tool as claimed in claim 1, wherein the holding parts include a first holding part and a second holding part corresponding to each other.

6. A control device of a cutting tool, wherein the cutting tool comprises a blade, a first component, a second component and a connection rod; the first component includes an anvil part; the first component is pivotally connected to the blade and one end of the blade is extended to form a blade handle while the blade handle includes an insertion hole, a hollowed-out window and a pin formed by an extension of one end thereof; the blade handle passes through the anvil part and is pivotally connected to one end of the first component; the second component includes a first assembly part and a receiving space formed by a first wall and a second wall; both the first wall and the second wall are disposed with a pivot hole; the first wall and the second wall are arranged with a first bulge and a second bulge respectively; the receiving space is used for mounting said control device and said control device is pivotally connected to the second component; wherein one end of the connection rod is pivotally connected to the second component while the other end thereof is pivotally connected to the window of the blade by a shaft so that the other end of the connection rod pivotally connected by the shaft moves a distance within the window; wherein the blade and the anvil part are switched between an open position and a close position for cutting by the pivotal connection of the first component and the second component; wherein said control device comprises:

a pivot part with a pivot hole, two holding parts formed by an extension of said pivot part, a platform part located between said holding parts and a groove formed on said platform part; and a support body having a connection part, a back part formed by an extension of said connection part and a hook part formed by an extension of one end of said back part;

wherein said support body is made from metal; a shape of the connection part is matched with a shape of said groove for being mounted in said groove; a horizontal surface of said back part and a horizontal surface of said platform part are on the same plane and said hook part projects from said platform part when said connection part is mounted in said groove, aligned with pivot hole of said pivot part, and pivotally connected to the second component; wherein said pivot part is mounted in the receiving space, aligned with the pivot holes of the first wall and the second wall, and pivotally connected to the second component by a shaft so that said control device is rotatable within the receiving space; said control device operates like a pendulum by pushing said holding parts;

wherein when said holding parts are pushed towards the first bulge, the cutting tool is in a one-time cutting mode in which the pin of the blade leans against said back part of said support body; wherein when said holding parts are pushed towards the second bulge, the cutting tool is in a multi-state cutting mode in which the pin of the blade does not lean against said back part of said support body;

wherein when said hook part is locked with the pin of the blade, said control device is used to lock the blade and the anvil part at the closed position.

7. A control device of a cutting tool, wherein the cutting tool comprises a blade, a pin formed at one end of the blade, a first component and a second component pivotally connected to each other and operated for performing cutting; wherein the second component includes a receiving space for mounting said control device, and a first bulge and a second bulge; wherein said control device comprises:

a pivot part with a pivot hole, two holding parts formed by an extension of said pivot part, a platform part located between said holding parts and a groove set formed on said platform part; and a support body having a connection part, a back part formed by an extension of said connection part and a hook part formed by an extension of one end of said back part;

wherein said support body is made from metal; a shape of said connection part is matched with a shape of said groove for being mounted in said groove; a horizontal surface of said back part and a horizontal surface of said platform part are on the same plane and said hook part projects from said platform part when said connection part is mounted in and pivotally connected to said groove; wherein said pivot part is mounted in said receiving space and pivotally connected to the second component by a shaft extending through the pivot hole of said pivot part and the receiving space so that said control device operates like a pendulum by pushing said holding parts;

wherein when said holding parts are pushed towards the first bulge, the cutting tool is in a one-time cutting mode in which the pin of the blade leans against said back part of said support body; wherein when said holding parts are pushed towards the second bulge, the cutting tool is in a multi-state cutting mode in which the pin of said blade does not lean against said back part of said support body;

wherein when said hook part is locked with the pin of the blade, said control device is used to lock the blade at a closed position.

8. A control device of a cutting tool, wherein the cutting tool includes, a blade, a first component, a second component and a connection rod; the first component and the second component are pivotally connected to each other and operated for performing cutting; wherein the first component includes an anvil part; the first component is pivotally connected to the blade and one end of the blade is extended to form a blade handle while the blade handle includes an insertion hole, a hollowed-out window and a pin formed by extension of one end thereof; the blade handle passes through the anvil part and is pivotally connected to one end of the first component; the second component includes a first assembly part and a receiving space for mounting said control device; the first assembly part is disposed with a pivot hole and arranged with a first bulge and a second bulge; wherein one end of the connection rod is pivotally connected to the second component and the other end thereof is pivotally connected to the window of the blade by a shaft so that the other end of the connection rod pivotally connected by the shaft moves a distance within the window; wherein said control device comprises:

a pivot part with a pivot hole, a first holding part and a second holding part formed by an extension of said pivot part, a platform part located between said first holding part and said second holding part, and a groove formed on said platform part; and a support body having a connection part, a back part formed by an extension of said connection part and a hook part formed by an extension of one end of said back part;

wherein said support body is made from metal; a shape of said connection part is matched with a shape of said groove and mounted in said groove; a horizontal surface of said back part and a horizontal surface of said platform part are on the same plane and said hook part projects from said platform part when said connection part is mounted in said groove, aligned with pivot hole of said pivot part and pivotally connected to the second component;

wherein said pivot part is mounted in said receiving space, and pivotally connected to the second component by a shaft so that said control device operates like a pendulum by pushing said first holding part and said second holding part;

wherein when said holding parts are pushed towards the first bulge, the cutting tool is in a one-time cutting mode in which the pin of said blade leans against said back part of said support body; wherein when said holding parts are pushed towards the second bulge, the cutting tool is in a multi-state cutting mode in which the pin of the blade does not lean against said back part of said support body;

wherein when said hook part is locked with the pin of the blade, said control device is used to lock the blade and the anvil part at a closed position.

* * * * *